No. 766,216. PATENTED AUG. 2, 1904.
F. T. CABLE & G. E. EDGAR.
STORAGE BATTERY.
APPLICATION FILED FEB. 26, 1903. RENEWED DEC. 19, 1903.
NO MODEL. 4 SHEETS—SHEET 1.
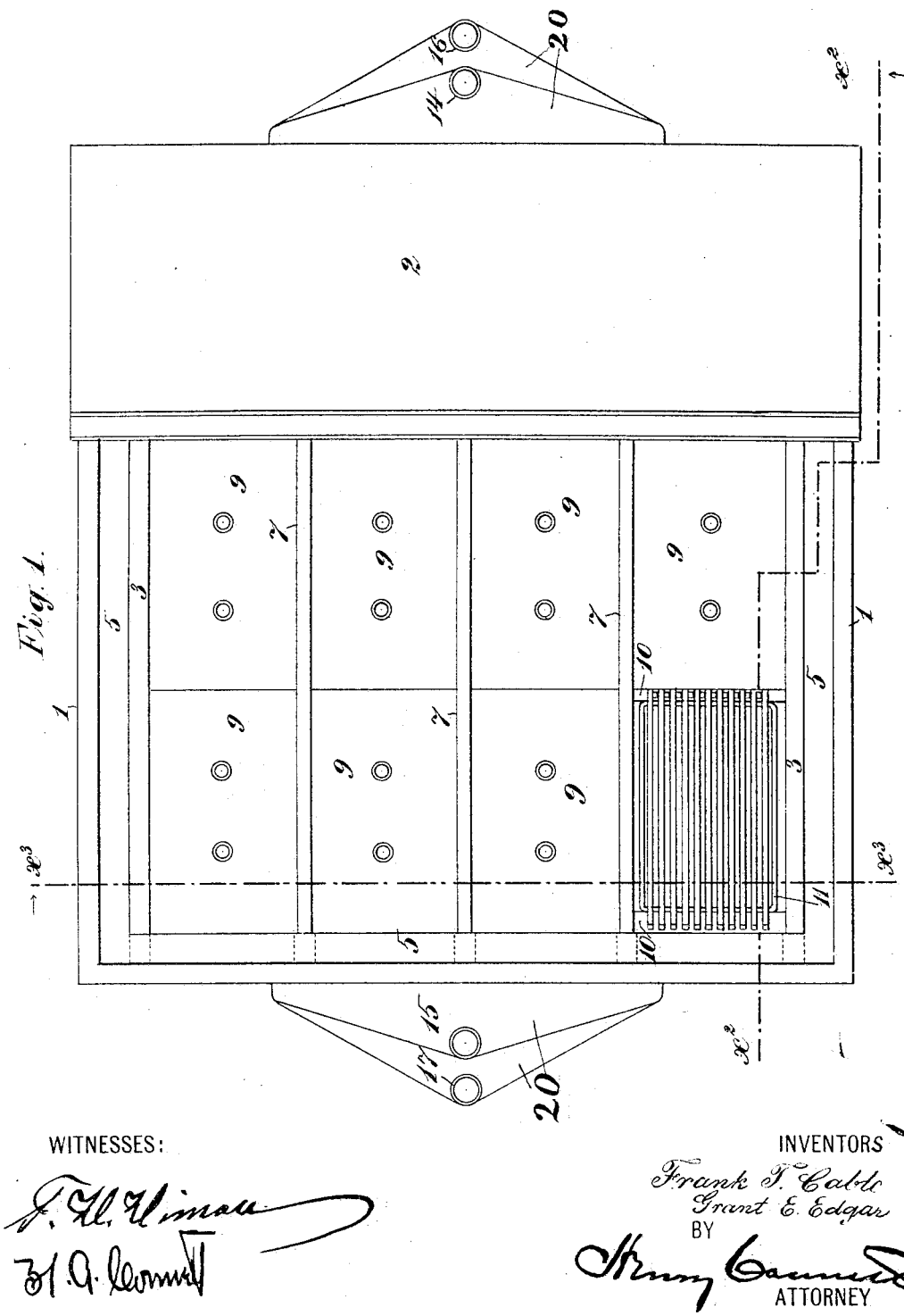
WITNESSES:
INVENTORS
Frank T. Cable
Grant E. Edgar
BY
ATTORNEY

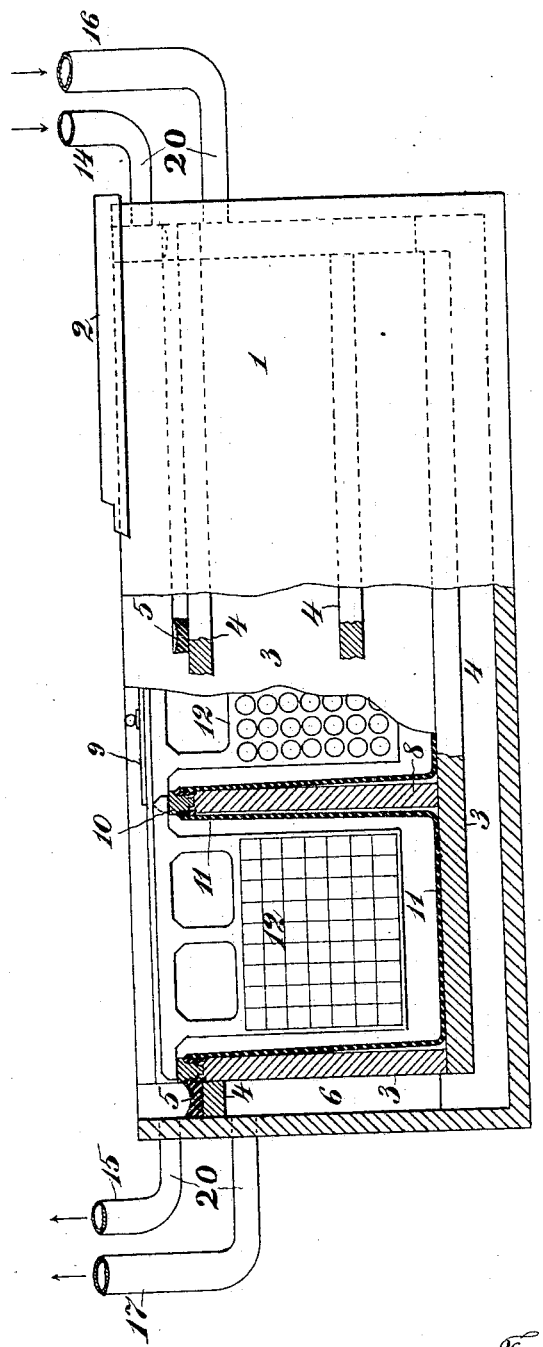

No. 766,216. PATENTED AUG. 2, 1904.
F. T. CABLE & G. E. EDGAR.
STORAGE BATTERY.
APPLICATION FILED FEB. 26, 1903. RENEWED DEC. 19, 1903.
NO MODEL. 4 SHEETS—SHEET 3.
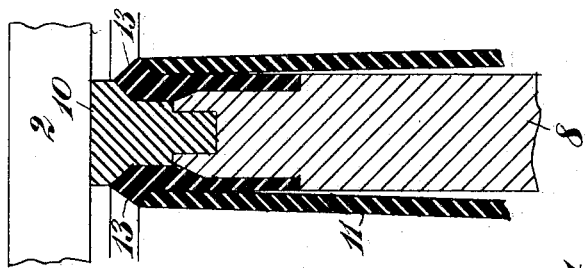
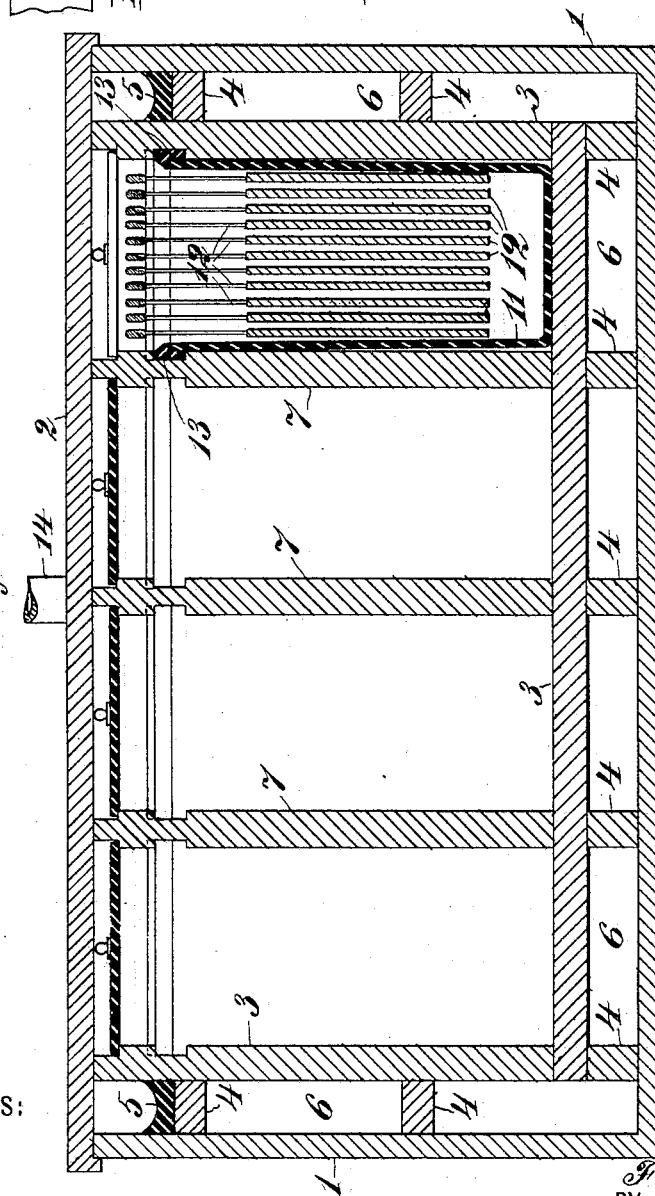
WITNESSES: INVENTORS
Frank T. Cable
BY Grant E. Edgar
ATTORNEY No. 766,216. PATENTED AUG. 2, 1904.
F. T. CABLE & G. E. EDGAR.
STORAGE BATTERY.
APPLICATION FILED FEB. 26, 1903. RENEWED DEC. 19, 1903.
NO MODEL. 4 SHEETS—SHEET 4.
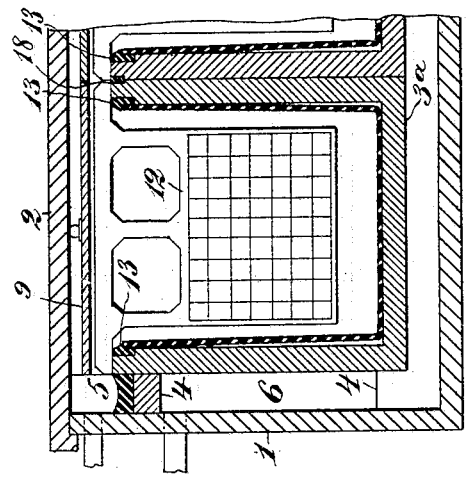
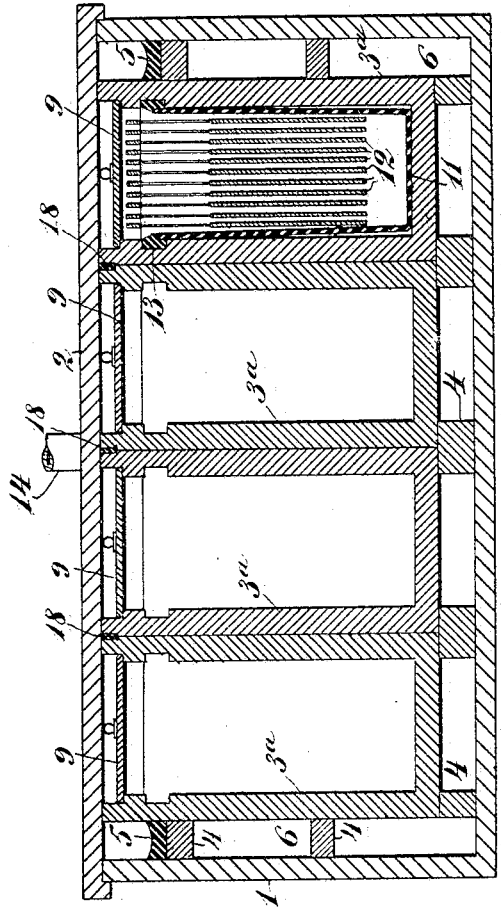
WITNESSES:
INVENTORS
Frank T. Cable
Grant E. Edgar
BY
ATTORNEY No. 766,216.                                                          Patented August 2, 1904.

UNITED STATES PATENT OFFICE.

FRANK T. CABLE, OF NEW SUFFOLK, AND GRANT E. EDGAR, OF GREEN-PORT, NEW YORK, ASSIGNORS TO ELECTRIC BOAT COMPANY, A CORPORATION OF NEW JERSEY.

STORAGE BATTERY.

SPECIFICATION forming part of Letters Patent No. 766,216, dated August 2, 1904.

Application filed February 26, 1903. Renewed December 19, 1903. Serial No. 185,900. (No model.)

*To all whom it may concern:*

Be it known that we, FRANK T. CABLE, residing at New Suffolk, and GRANT E. EDGAR, residing at Greenport, in the county of Suffolk and State of New York, citizens of the United States, have jointly invented certain new and useful Improvements in Storage Batteries, of which the following is a specification.

This invention relates to storage batteries or accumulators such as are used on vessels, and especially submarine or partly-submerged vessels; and the object is to insulate one cell from another and the entire battery from the vessel, to ventilate the battery, to prevent the liquid electrolyte from slopping over into the vessel or from one bank of cells into another, and to provide for the support of the heavy elements of the cell, so as to permit the use of glass, earthenware, or hard-rubber receptacles in the cells to contain the liquid electrolyte.

In the accompanying drawings, which serve to illustrate an embodiment of the invention, Figure 1 is a plan of the battery with part of the main outer cover omitted and one of the inner cell-covers removed. Fig. 2 is a vertical section at line $x^2$ in Fig. 1. Fig. 3 is a vertical section at line $x^3$ in Fig. 1. Fig. 4 is a sectional detail view, on a large scale, showing the adhesive insulating material. Fig. 3 is on a larger scale than Fig. 1. Figs. 5 and 6 are respectively a transverse and longitudinal section illustrating a construction wherein the inner tank is sectional.

The outer inclosing tank or box 1, which has a cover 2, may be made of wood or other suitable material. In this outer tank is set a smaller tank 3, which fits close up at its sides against the cover 2, but is held away from the side walls of the outer tank by means of distancing-strips 4 at the sides and bottom. These strips extend lengthwise of the tank. Surrounding the inner tank and preferably a little below its top is a gas-tight partition formed of the upper distancing-strip 4 and a dielectric adhesive and plastic composition 5, bedded on the distancing-strips. The space 6 between the two tanks is thus separated in such a way as to prevent any acid or acid liquid that may slop or flow over the rim of the inner tank from getting into this interspace. The space 6 is employed as an air-duct, as will be hereinafter explained.

The inner tank 3 is divided by longitudinal partitions 7 and cross-partitions 8 into cell spaces or chambers, of which the battery herein shown contains twelve, and the partitions 7 extend up, Fig. 3, to the cover 2 and are rabbeted at their upper edges to receive and support suitable cell-covers 9. The cross-partitions 8 carry on their upper edges strips 10, which may be of any insulating material, as glass, porcelain, hard rubber, &c. In the cell-spaces, seen empty at the left in Fig. 3, are set the cells or cups 11, which may be of glass, porcelain, or like acid-proof material. The heavy elements 12 of the cell are supported on the insulating-strips 10, whereby the weight of the elements is removed from the cell or cup 11 and transferred to the cross-partition.

To prevent access of acid to the space about the cell 11 and between it and the partitions which divide the inner box into cell-spaces, the joints are made acid-proof by a dielectric adhesive substance or composition 13, as clearly shown in Figs. 3 and 4. In effecting this object the partitions 7 and 8 are recessed to receive a body of the sealing substance, and the strips 10 also, as best shown in Fig. 4.

One end of the tank is provided with an intake 14 for air above the level of the cells and the other end is provided with an exhaust 15, situated also above the level of the cells. This is for the withdrawal of gases by some form of exhaust apparatus, as a fan or the like. At the respective ends of the tank are also an intake 16 and an exhaust 17 for air. These connect with the interspace 6 between the inner and outer tanks and provide a current of air through said space. Each of these intake and exhaust pipes is broadened laterally where it joins the box 1, as clearly shown in Fig. 1. These laterally-broadened portions 20 are employed to connect the said pipes with the spaces over the four rows of cells. This circulation may be obtained by a blower or exhaust-fan of any known kind.

The purpose of maintaining a circulation of air through the interspace 6 is to maintain a barrier free from aqueous moisture entirely around and underneath the battery-cells or about the inner tank 3, containing the same.

The supporting-strips 10, upon which the lugs of the heavy elements rest, might be in one with the partitions 8, on which they are mounted; but the construction described is the one preferred.

The inner tank 3 may be made in sections, if deemed most convenient. Figs. 5 and 6 illustrate this construction. In these views $3^a$ designates the several sections which go to form the inner tank, and in Fig. 6 the elements 12 are represented as supported directly on the ends of the said sections, which correspond to the cross-partitions 8 of the principal views. To prevent access of liquid between the sections, the sides are rabbeted at their upper edges, and the recess formed is filled with an adhesive dielectric substance, as seen at 18 in these views; otherwise the construction is the same as has been described.

Having thus described our invention, we claim—

1. A storage battery having an inner tank containing the cells, covers for the cells, an outer tank, a cover on the outer tank elevated above the cell-covers, thus providing a space over the cells, and an inlet and outlet to said space for maintaining a current of air over the cells.

2. A storage battery for vessels having an inner tank containing the cells, an outer tank, an interspace between said tanks, and an inlet and outlet to said interspace for maintaining a current of air through said space, said current serving as a barrier to aqueous moisture and for the removal of moisture.

3. A storage battery for vessels having a tank, a cover therefor, longitudinal partitions which extend up to the cover, cross-partitions which are somewhat lower than the longitudinal partitions, thereby forming longitudinal ducts over the cells, and means for carrying off the gases from said ducts at their ends.

4. A storage battery for vessels having a tank divided into rectangular compartments, two opposite walls of each compartment being lower than the other two walls thereof, insulating-strips on the said lower walls, and the elements of the battery-cell supported on said insulating-strips.

5. A storage battery having a tank or container with double walls and bottom and an interspace between said walls and bottom, an inlet and an outlet to said interspace, the cells, a space over the cells and wholly separated from said interspace, and an inlet and outlet to said space over the cells, substantially as and for the purpose set forth.

6. A storage battery having a tank divided by partitions into compartments, a cup of acid-proof material in each of said compartments and lining the latter, the walls of each compartment being recessed near the upper margin of the cup therein, and a sealing material 13 of a dielectric compound about the margin of said cup and in said recesses, substantially as and for the purpose set forth.

7. A storage battery for vessels comprising a tank with cell-compartments, a cup fitted into each compartment and sealed about its upper edge with a dielectric adhesive compound, and the elements in each cell supported on the wall of the cell above the upper margin of the cup therein.

8. A storage battery having an outer tank and an inner tank with an interspace between them, strips 4 near the tops of said tanks in said interspace, an adhesive dielectric compound 5 on said strips 4, and means for removing the gases above the cells.

In witness whereof we have hereunto signed our names, this 5th day of February, 1903, in the presence of two subscribing witnesses.

FRANK T. CABLE.
GRANT E. EDGAR.

Witnesses:
H. G. TUTHILL,
F. L. BRAKE.